(12) United States Patent
Bonar et al.

(10) Patent No.: US 10,498,452 B1
(45) Date of Patent: Dec. 3, 2019

(54) INTEGRATED LIGHT EMITTING DIODE DEVICE FOR OPTICAL COMMUNICATION SYSTEMS

(71) Applicant: Facebook Technologies, LLC, Menlo Park, CA (US)

(72) Inventors: James Ronald Bonar, Erskine (GB); Gareth John Valentine, York (GB)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/644,515

(22) Filed: Jul. 7, 2017

(51) Int. Cl.
 *H04B 10/50* (2013.01)
 *H05B 33/08* (2006.01)
 *H04Q 11/00* (2006.01)
 *H04B 10/116* (2013.01)

(52) U.S. Cl.
 CPC ......... *H04B 10/502* (2013.01); *H04B 10/116* (2013.01); *H04Q 11/0003* (2013.01); *H05B 33/0857* (2013.01)

(58) Field of Classification Search
 None
 See application file for complete search history.

(56) References Cited

U.S. PATENT DOCUMENTS

| 5,134,340 | A  | * | 7/1992  | Haitz    | B41J 2/45    |
|           |    |   |         |          | 257/88       |
| 5,724,055 | A  | * | 3/1998  | Omae     | G09G 3/006   |
|           |    |   |         |          | 257/88       |
| 5,798,535 | A  | * | 8/1998  | Huang    | H01L 27/156  |
|           |    |   |         |          | 257/83       |
| 7,791,092 | B2 | * | 9/2010  | Tarsa    | H01L 25/0753 |
|           |    |   |         |          | 257/98       |
| 9,502,595 | B2 |   | 11/2016 | Percival |              |
| 2008/0179602 | A1 | * | 7/2008 | Negley | H01L 21/2654 |
|           |    |   |         |          | 257/88       |
| 2012/0310703 | A1 | * | 12/2012 | Cavalcanti | G06Q 30/0201 |
|           |    |   |         |          | 705/7.29     |
| 2015/0312990 | A1 | * | 10/2015 | van de Ven | H05B 33/0857 |
|           |    |   |         |          | 315/186      |

* cited by examiner

*Primary Examiner* — Darren E Wolf
(74) *Attorney, Agent, or Firm* — Fenwick & West LLP

(57) ABSTRACT

A light emitting diode (LED) device includes micro LEDs and one or more macro LEDs formed on the same semiconductor substrate. Each micro LED emits modulated light to perform communication with another device. Each macro LED emits light to illuminate an environment surrounding the LED device and the size of the macro LED is relatively larger than the micro LED. The LED device may further include a notch filter to filter light generated by the macro LEDs so that the light from the macro LEDs do not interfere with communication performed by the micro LEDs.

15 Claims, 4 Drawing Sheets

INTEGRATED LIGHT EMITTING DIODE DEVICE FOR OPTICAL COMMUNICATION SYSTEMS

BACKGROUND

Field of the Disclosure

The present disclosure generally relates to light emitting diodes (LEDs), and specifically to an integrated light emitting diode (LED) device for illumination and optical communication.

Description of the Related Arts

Optical communication systems may use micro LEDs as light sources operate with significantly higher modulation rates. However, typical micro LED arrays used as light source have a low active area fill factor which results in the generation of light with low light intensity. Accordingly, such micro LEDs are not best suited for general illumination purpose.

SUMMARY

Embodiments relate to a light emitting diode (LED) device including micro LEDs formed on a semiconductor substrate and one or more macro LEDs formed on the same semiconductor substrate. Each micro LED emits modulated light to perform communication with another device. Each macro LED emits light to illuminate an environment of the LED device. The size of the macro LED is larger than the size of each micro LED.

In some configurations, each micro LED transmits a multi-channel data based on an orthogonal frequency division multiplexing (OFDM).

In some embodiments, the LED device includes a notch filter on the macro LED for blocking a band of light with wavelength corresponding to the modulated light. In some configurations, the notch filter is deposited on an epoxy layer.

In some embodiments, each micro LED is surrounded by the epoxy layer and each macro LED is coated with the epoxy layer. Each of the micro LEDs and the macro LED may be surrounded by a color conversion layer in either directly or in a remote location. This may consist of phosphors, QDs or an alternative material for white light generation. In alternative embodiments, the LED device includes a plurality of micro LEDs and one or more macro LEDs formed on the same semiconductor substrate, and the notch filter surrounds the one or more macro LEDs.

BRIEF DESCRIPTION OF THE DRAWINGS

The teachings of the embodiments can be readily understood by considering the following detailed description in conjunction with the accompanying drawings.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to a light emitting diode (LED) device comprising one or more micro LEDs formed on a single substrate and one or more macroLEDs formed on the same substrate. Each micro LED emits modulated light to perform communication with another device. Each macro LED emits light to illuminate an environment surrounding the LED device and the size of the macro LED is larger than the micro LED.

Figure 1:
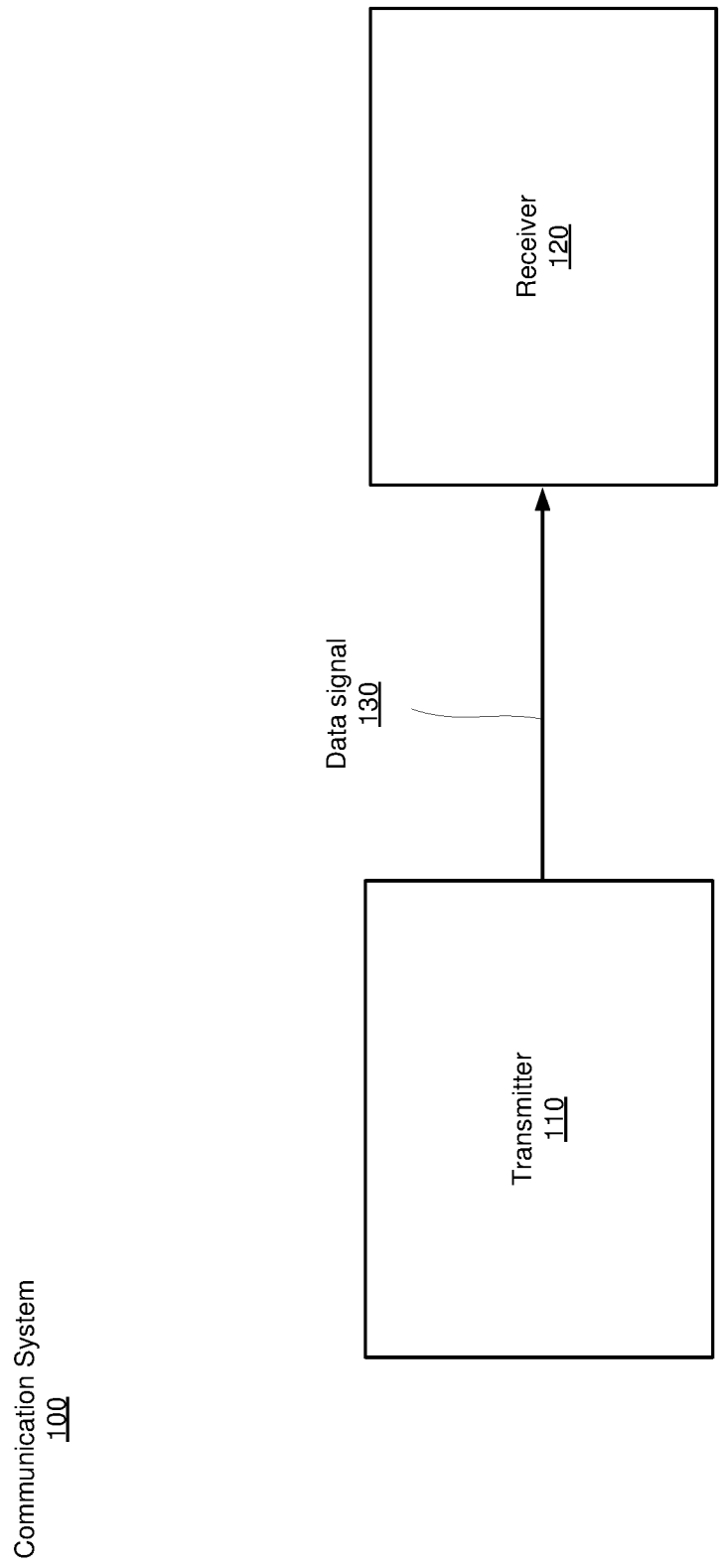
FIG. 1 is a block diagram of a communication system, in accordance with one embodiment.

FIG. 1 is a block diagram of a communication system 100, in accordance with one embodiment. The communication system 100 uses light as the transmission medium for communicating. The communication system 100 includes a transmitter 110 and a receiver 120. In some embodiments, the communication system 100 is an optical communication system that uses an unguided light as a transmission medium.

The transmitter 110 is a component that transmits a data signal 130 for conveying data to the receiver 120. In some configurations, the transmitter 110 transmits a carrier signal in the form of a modulated light to carry information. In some configurations, the modulated light component may include a visible light, an infrared light, an ultraviolet light, or a combination thereof. The transmitter 110 may include components, including, but not restricted to, a noise filter, an analog to digital converter, an encoder, a modulator, a signal amplifier, and an antenna.

The receiver 120 is a component that receives a signal transmitted by the transmitter 110. In some configurations, the receiver 120 includes an electronic subsystem that reproduces a message from the received carrier signal. The receiver 120 includes several components, including, but not restricted to, a narrow bandpass filter, a digital to analog converter, a decoder, a demodulator, and a signal amplifier.

Figure 2:
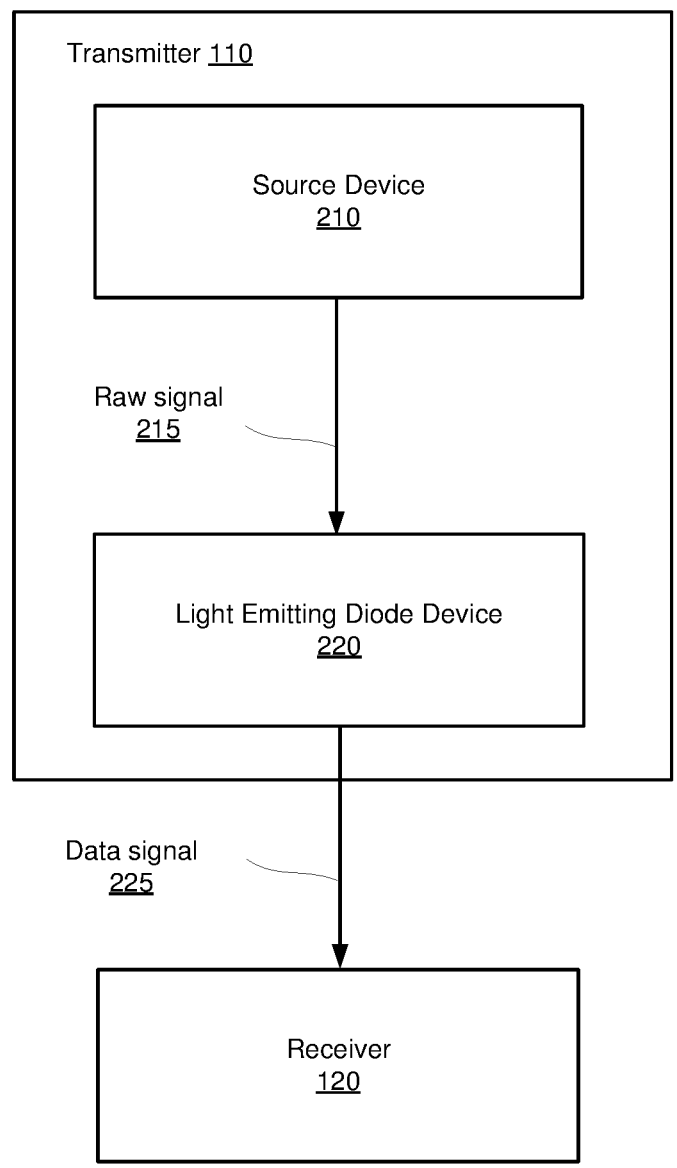
FIG. 2 is a block diagram of the communication system of FIG. 1 including a light emitting diode (LED) device, in accordance with one embodiment.

FIG. 2 is a block diagram of the communication system of FIG. 1 including a light emitting diode (LED) device, in accordance with one embodiment. The communication system may include, among others, a transmitter 110 and a receiver 120. The transmitter 110 may include, among other components, a source device 210 and one or more light emitting diode (LED) device 220.

The source device 210 is a device functioning as a data source for data to be sent to the receiver 120. In some configurations, the source device 210 transmits raw signals 215 to a LED device 220 including an array of light emitting diodes (LED). The raw signal 215 may be an electric signal transmitted from an output terminal of the source device 210.

The LED device 220 is a light emitting device that emits one or more components of light for the purpose of illumination and communication. The LED device 220 includes an array of micro LEDs and one or more macro LEDs of larger sized than each of the micro LED, as described in detail below with reference to FIG. 3. The micro LEDs generate optical signals as the data signal 225 while the macro LEDs generates light for the purpose of illumination.

The receiver 120 is a device that receives the data signal 225 signal from the transmitter 110. The data signal 225 is an optical signal generated by the micro LEDs of the light emitting diode device 220.

Figure 3:
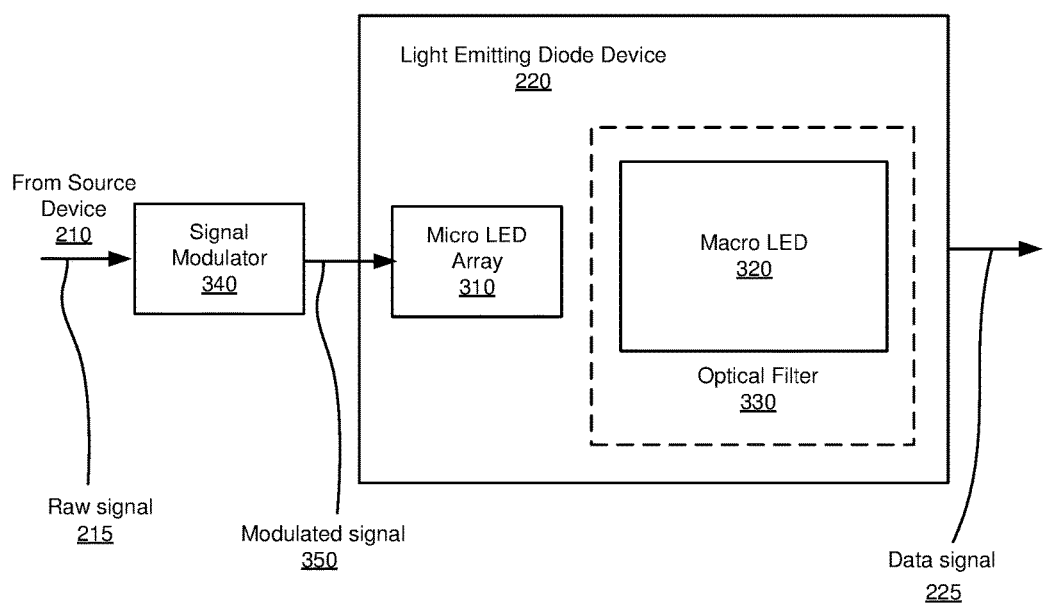
FIG. 3 is a block diagram of a portion of the communication system illustrating the components of the LED device, in accordance with one embodiment.

FIG. 3 is a block diagram of the communication system illustrating the components of the LED device 220, in accordance with one embodiment. In the embodiment of FIG. 3, the LED device 220 includes a micro LED array 310, a macro LED 320, an optical filter 330 and a signal modulator 340. The micro LED array 310 and the macro LED 320 are formed on the same substrate.

The micro LED array 310 is an array of LEDs that emit light to perform communication. The micro LEDs of the array 310 may be arranged in one or two dimensional pattern. All of the micro LEDs in the array 310 may be of the same dimension or different dimensions, and may also output light of same characteristics or be individually tuned to generate light of different characteristics. Each of the micro LEDs can be subjected to a current-dependent electroluminescence shift such that each of the micro LEDs emits at a threshold value of modulation wavelength. In some configurations, all of the micro LEDs in the array 310 are associated with characteristics such as lambertian emission, a specific range of divergent beam angles (e.g. less than 30 degrees), a specific range of beam cone angles (e.g. between 5 degrees and a lambertian profile), and a specific range of pointing angles (e.g. normal to the substrate, or up to 45 degrees).

The macro LED 320 is a light emitting device that emits light for illuminating an environment. The macro LED 320 is of a larger size compared to each of the micro LEDs and provides light of sufficient intensity to illuminate the environment. In alternate embodiments, the macro LED 320 includes three macro LEDs (not shown here) that each emit a red-colored light (e.g. wavelength of around 650 nm), a green-colored light (e.g. wavelength of around 510 nm) and a blue-colored light (e.g. wavelength of around 475 nm), and a color combiner (not shown here) combines each of these colored light into a white light.

Both the micro LEDs and the macro LED 320 may be made of materials such as compound semiconductors (e.g. GaN or GaAs)

As described below with reference to FIG. 4, the micro LED array 310 and the macro LED 320 can be encapsulated in an epoxy. In some configurations, the epoxy is a medium containing color conversion material for general lighting applications.

The LED device 220 may also include an optical filter 330 that filters light generated by one or more macro LEDs 320. The optical filter 330 may be embodied as a notch filter that blocks light of predefined range of wavelengths that corresponds to the wavelengths of light emitted by the micro LED array 310. The optical filter 330 is placed on the macro LEDs 320 but not on the micro LED array 310. Hence, the light emitted by the micro LED array 310 is transmitted to the receiver 120 without attenuation by the optical filter 330 whereas the light emitted by the macro LEDs 320 are removed of light components with the same wavelengths as the light emitted by the micro LED array 310. In this way, the light from the macro LEDs 320 does not interfere with the communication performed by the micro LED array 310. The notch filter may be a narrow band-stop filter with a stopband matching the peak wavelength of the micro LED array 310. For example, this may be a 10 nm shift from the peak of the macro LED 320 with a bandpass of 4 nm. Such a configuration will improve the Signal-to-Noise Ratio (SNR) of the LED device 220, with the light from the background level/noise from the macro LED 320 reduced. Furthermore, it is also possible to have a color conversion layer (e.g. Ce:YAG phosphor) selectively deposited on the macro LED 320 to further reduce the transmitted signal.

The signal modulator 340 is a circuit that modulates an input signal to generate modulated signal 350 for actuating the micro LED array 310. The signal modulator 340 may be an optical modulator that performs a modulation of at least one of amplitude, frequency, phase and polarization of the input signal. In the embodiment of FIG. 3, the signal modulator 340 received the raw signal 215 from the source device 210 and outputs a modulated signal 350 to the micro LED array 310. In one example, the modulated signal 350 is an electrical signal to the micro LED array 310 which may operate at a wavelength of 430 nm and a spectral bandwidth of 20 nm. This has the added advantage that the human eye response is lower at this wavelength. The LED device 220 outputs the data signal 225 based on the received modulated signal 350. In some configurations, the LED device 220 outputs a multi-channel data with a threshold value of modulation based on an orthogonal frequency division multiplexing. Furthermore, the micro LED array 310 may be designed to change the divergence of the beam and/or the beam angle. This can be achieved by using structures such as integrated parabolic reflectors (or shapes of this type) in the micro LED array 310. More information about the parabolic shaped micro LEDs can be found at U.S. Pat. No. 9,502,595 issued on Nov. 22, 2016, which is incorporated by reference herein in its entirety. This can provide advantages relating to the luminance of each of the micro LEDs. Another embodiment would be to offset the electrical contact within each parabolic micro LED and to deliberately have the micro LED array 310 with beam angles which vary in their emission direction, so as to increase the transmission range of each of the micro LEDs and to enhance coverage of the signal.

In some embodiments, the micro LED array 310 is modulated with at least one of: an identical signal, a multi-channel signal, multi-channel signals emitted at one or more central wavelengths, multi-channel signals modulated with multi-channel control signals multiplexed in the time-domain.

Figure 4:
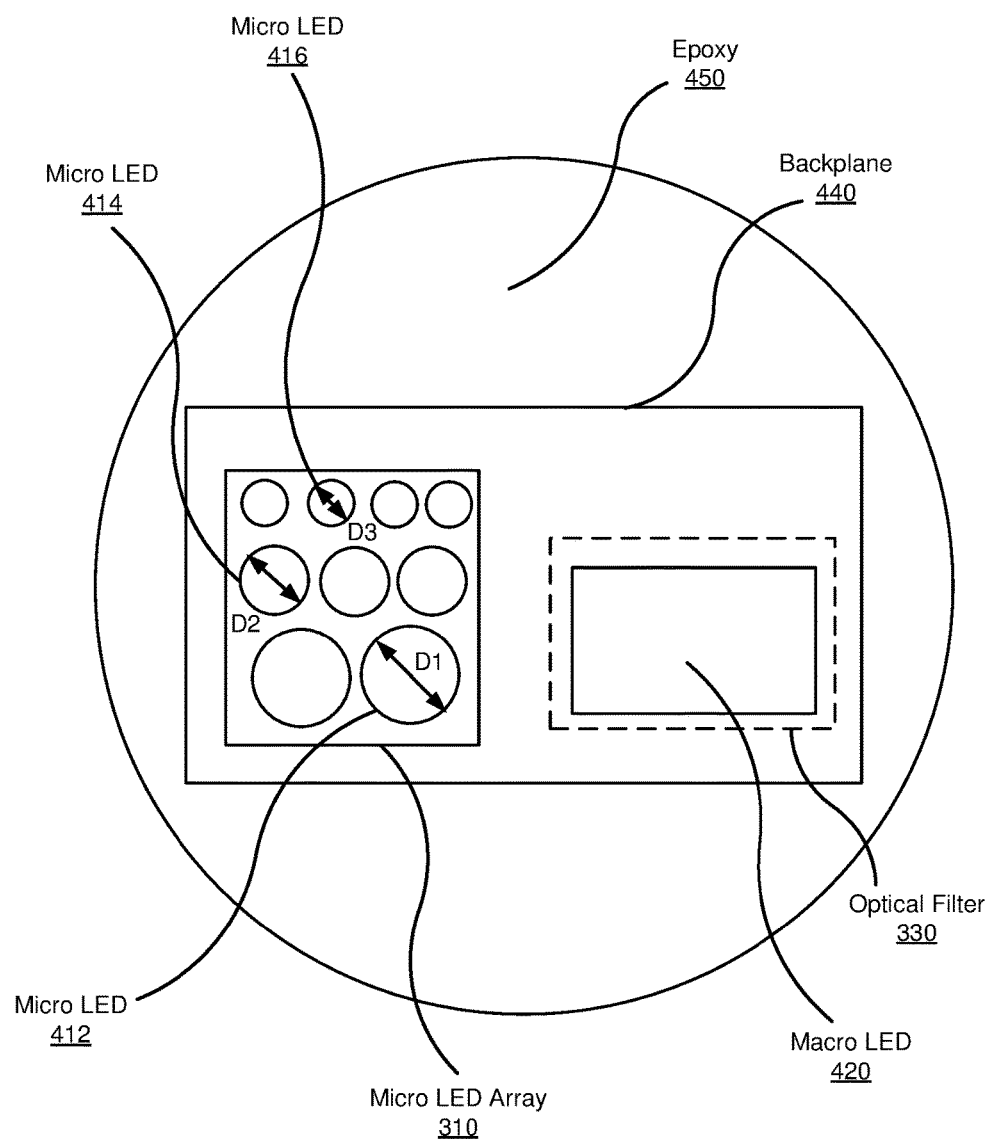
FIG. 4 is a top view of the LED device, including an epoxy providing color conversion, in accordance with one embodiment.

FIG. 4 is a top view of the LED device 220, including an epoxy providing color conversion, in accordance with one embodiment. The LED device 220 may include, among other components, a micro LED array 410, a macro LED 420, an optical filter 330, a backplane 440 and an epoxy 450. In the embodiment of FIG. 4, the micro LED array 410 includes micro LEDs 412, micro LEDs 414, and micro LEDs 416. The backplane 440 could be based on CMOS, LTPS, TFT or any other type of technology to connect to the LED device and provide the necessary performance.

Micro LEDs in the array 310 may have different characteristics and/or sizes. The dimension of the micro LED may be in the range of 1 to 100 um in diameter. The shape and the process to define the micro LEDs will be known to those skilled in the art. For example, the micro LED 412 has a diameter D1 of 5 µm, the micro LED 414 has a diameter D2 of 20 µm, and the micro LED 416 has a diameter D3 of 50 µm. Each of the micro LEDs in the array 410 may emit light in the same wavelength range (i.e., all blue color). In alternative embodiments, each of the micropixels in the micro LED array 410 emits light of different wavelength ranges. In some configurations, the micro LED array 410 produces a shift in the modulation wavelength based on the size of each of the micro LEDs. For example, when the diameter of a micro LED is decreased, the modulation wavelength of the micro LED is decreased for the same drive current owing to the well know quantum confined Stark effect The macro LED 420 is an embodiment of the macro LED 320 of FIG. 3. The macro LED 420 typically has a shape of a rectangle and is dimensioned to be larger than each of the micro LEDs. For those skilled in the art there are a range of dimensions and processes to form a macro LED and/or macro LED array. The dimension of the macro LED 420 may be greater than 80 µm×80 µm and large area such as 5 mm×5 mm. a common footprint is 1 mm×1 mm.

In the embodiment of FIG. 4, the integrated LED device includes a backplane 440 that mounts each of the micro LED array 410, the macro LED 420 and the optical filter 330. In this particular embodiment, the backplane is CMOS controlled. It should be noted that there are a range of other backplane technologies that can be utilised. In some configurations, the micro LED array 310 and the macro LED 420 are mounted on separate dies of the backplane 440. The backplane 440 is a semiconductor substrate including a plurality of dies that provides electrical signals to the micro LED array 410 and the macro LED 420. The backplane 440 may include an addressing circuit that provides an electrical signal to each of the micro LED array 410 and the macro LED 420.

In some configurations, the micro LED array 410 is covered by an epoxy 450. The macro LED 420 coated with the epoxy 450 and the optical filter 330 are deposited on the epoxy 450. The epoxy 450 may include phosphor to provide color conversion. As an example, in general lighting, the color conversion material may consist of a phosphor and/or a Quantum Dot (QD) and/or other material system to convert the light from the macro LED 420 for perceived white light generation, e.g. by emission of a broadband yellow emission in combination with a blue emission from the macro LED 420, or multiple narrow band emissions from materials emitting in the red, green and blue excited by a UV or blue emission by the macro LED 420. There is a variety of other methods known to those skilled in the art. It is also possible to selectively incorporate the color conversion so that it is only in the path of the macro LED 420. This has the added advantage of reducing the relative noise level to the receiver from the macro LED 420 as more of the light is absorbed by the phosphor, e.g. Ce:YAG to provide emission in the yellow wavelength region.

In some configurations, the optical filter 330 is selectively deposited on the epoxy 450. In alternate configurations, the optical filter 330 is deposited on the macro LED 420.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

What is claimed is:

1. A light emitting diode (LED) device comprising:
   a plurality of distinct and separate micro LEDs formed on a semiconductor substrate;
   one or more macro LEDs distinct and separate from the micro LEDs and formed on the same semiconductor substrate, each of the one or more macro LEDs larger than each of the plurality of micro LEDs; and
   a notch filter on the one or more macro LEDs, the notch filter covering the one or more macro LEDs but not covering the plurality of micro LEDs, wherein the notch filter has a stopband including a peak wavelength of the plurality of micro LEDs.

2. The LED device of claim 1, further comprising an epoxy layer on the plurality of micro LEDs and the one or more macro LEDs, wherein the notch filter is selectively deposited on the epoxy layer.

3. The LED device of claim 1, further comprising an epoxy layer on the plurality of micro LEDs and the one or more macro LEDs.

4. The LED device of claim 1, further comprising an epoxy layer on the plurality of micro LEDs and the one or more macro LEDs, wherein the epoxy layer includes a material to convert the light from the one or more macro LEDs to a colored light.

5. The LED device of claim 1, wherein the plurality of micro LEDs are mounted on a first die of the semiconductor substrate, and the one or more macro LEDs are mounted on a second die of the semiconductor substrate different from the first die.

6. The LED device of claim 1, wherein the one or more macro LEDs emits a plurality of lights of a first band, a second band, and a third band, the plurality of lights combined to generate a light of a fourth band.

7. The LED device of claim 1, wherein each of the micro LEDs have a diameter or width of 10 microns and each of the macro LEDs have a diameter or width of 1 millimeter.

8. The LED device of claim 1, wherein the semiconductor substrate is made of GaN or GaAs.

9. The LED device of claim 1, wherein each of the plurality of micro LEDs has a diameter in a range of 1 to 100 micrometers.

10. The LED device of claim 9, wherein each of the one or more macro LEDs has a diameter that is greater than 80 micrometers.

11. A light emitting diode (LED) device comprising:
    a plurality of distinct and separate micro LEDs formed on a semiconductor substrate;
    one or more macro LEDs distinct and separate from the micro LEDs and formed on the same semiconductor substrate, each of the one or more macro LEDs larger than each of the plurality of micro LEDs;
    a notch filter on the one or more macro LEDs, the notch filter covering the one or more macro LEDs but not covering the plurality of micro LEDs, wherein the notch filter has a stopband including a peak emission wavelength of the plurality of micro LEDs;
    a source device configured to generate and transmit a plurality of data signals for driving the plurality of micro LEDs and the one or more macro LEDs; and
    a signal modulator configured to receive at least one of the plurality of data signals for driving the plurality of micro LEDs from the source device, modulate the at least one received data signal, and transmit the at least one modulated data signal to the plurality of micro LEDs, wherein the plurality of micro LEDs emit modulated light based on the at least one modulated signal.

12. The LED device of claim 11, wherein each of the plurality of micro LEDs is modulated with an identical signal.

13. The LED device of claim 11, wherein each of the plurality of micro LEDs is modulated with a multi-channel signal.

14. The LED device of claim 11, wherein each of the plurality of micro LEDs is modulated with one or more multi-channel signals emitted at one or more central wavelengths.

15. The LED device of claim 11, wherein each of the plurality of micro LEDs is modulated with a plurality of multi-channel signals modulated with multi-channel control signals multiplexed in a time domain.

* * * * *